United States Patent
Torres Velasco et al.

(10) Patent No.: US 10,841,300 B2
(45) Date of Patent: Nov. 17, 2020

(54) SYSTEM, METHOD AND COMPUTER PROGRAMS FOR USER AUTHENTICATION AND/OR AUTHORIZATION

(71) Applicant: TELEFONICA DIGITAL ESPAÑA, S.L.U., Madrid (ES)

(72) Inventors: José Torres Velasco, Madrid (ES); Aruna Prem Bianzino, Madrid (ES); Alvaro Nunez-Romero Casado, Madrid (ES); Sergio De Los Santos Vilchez, Madrid (ES)

(73) Assignee: TELEFONICA DIGITAL ESPAÑA, S.L.U., Madrid (ES)

( * ) Notice: Subject to any disclaimer, the term of this patent is extended or adjusted under 35 U.S.C. 154(b) by 0 days.

(21) Appl. No.: 16/402,934

(22) Filed: May 3, 2019

(65) Prior Publication Data
US 2019/0342285 A1 Nov. 7, 2019

(30) Foreign Application Priority Data

May 4, 2018 (EP) ..................................... 18382310

(51) Int. Cl.
*H04L 29/06* (2006.01)
*G06K 19/077* (2006.01)
(Continued)

(52) U.S. Cl.
CPC .... *H04L 63/0853* (2013.01); *G06K 19/07703* (2013.01); *G07C 9/29* (2020.01); *H04L 9/0897* (2013.01); *H04L 9/3234* (2013.01)

(58) Field of Classification Search
CPC ................................................ H04L 63/0853
(Continued)

(56) References Cited

U.S. PATENT DOCUMENTS

| 9,652,066 B2 | 5/2017 | Setlak | |
|---|---|---|---|
| 2014/0210589 A1* | 7/2014 | Grace | G06F 21/32 340/5.51 |

(Continued)

FOREIGN PATENT DOCUMENTS

| EP | 2527955 A1 | 5/2011 |
|---|---|---|
| EP | 2 722 739 A1 | 10/2012 |

(Continued)

OTHER PUBLICATIONS

European Search Report for EP 18 38 2310 dated Jul. 10, 2018.

*Primary Examiner* — Allyson N Trail
(74) *Attorney, Agent, or Firm* — Sughrue Mion, PLLC

(57) ABSTRACT

The system includes a passive card (10) configured to store a first portion of an authentication or authorization code via a set of capacitive points (11) included on its surface; and a portable computing device (20) having a capacitive screen and being configured to store a second portion of said authentication or authorization code. Such that, once the user (1) has requested access to a specific service or to a specific operation and when the passive card (10) is in contact with the capacitive screen, the portable computing device (20) is further configured to read at least some of the set of capacitive points (11), decoding the first portion, and cryptographically signing the decoded first portion using said stored second portion, providing the authentication or authorization code, which is used as cryptographic key to grant access to said specific service or specific operation to the user (1).

13 Claims, 1 Drawing Sheet

(51) Int. Cl.
*H04L 9/08* (2006.01)
*H04L 9/32* (2006.01)
*G07C 9/29* (2020.01)

(58) Field of Classification Search
USPC .......................................... 235/380, 379, 385
See application file for complete search history.

(56) References Cited

U.S. PATENT DOCUMENTS

| | | | |
|---|---|---|---|
| 2015/0121499 A1* | 4/2015 | Suwald | G06F 21/32 |
| | | | 726/7 |
| 2016/0004407 A1 | 1/2016 | Brouns et al. | |
| 2016/0307180 A1* | 10/2016 | Hammad | G06Q 20/202 |
| 2017/0039567 A1* | 2/2017 | Stern | G06Q 20/409 |

FOREIGN PATENT DOCUMENTS

| | | |
|---|---|---|
| WO | 2009/009788 A1 | 1/2009 |
| WO | 2017/024011 A1 | 2/2017 |
| WO | 2017/143193 A1 | 8/2017 |

* cited by examiner

SYSTEM, METHOD AND COMPUTER PROGRAMS FOR USER AUTHENTICATION AND/OR AUTHORIZATION

FIELD OF THE INVENTION

The present invention generally relates to user authentication and/or authorization systems and methods. In particular, present invention proposes a passive card with capacitive points on its surface and a portable computing device to be used in authentication and/or authorization solutions.

BACKGROUND OF THE INVENTION

Users constantly access services and resources from mobile and portable computing devices. The authentication of the accessing users is of paramount importance to protect the access to services themselves, resources and sensitive data, and limit it to only the authorized users.

The need of identifying users consuming different types of services is closely related to the prevention of identity theft but privacy security must also be considered. It is therefore of extreme interest to establish whether users are who they claim to be, but it is as much important to keep confidentiality about the exchanged information in such process.

The user identification process is usually based on some credentials, whose ownership and verification guarantee to check the user identity. The used credentials are usually issued by a trusted authority and are theoretically impossible (or at least extremely difficult) to falsify, allowing to determine whether the users correspond to who they claim to be or not.

The user identification process is built on top of the so-called validation or authentication mechanisms. Such mechanisms are designed to validate some information that the user brings to access the requested (digital) services. The carried information (which the user provides to the authentication mechanism to be validated) usually fall into one of the following categories: something that the user knows (e.g., a secret keyword), something that the user owns (e.g., an physical object also called physical token, like a smartcard, a SIM card, an NFC tag . . . ), something that the owner is (e.g., any measurable physical feature, univocally identifying the user, like fingerprints or iris identification), something that the user does (e.g., motion patterns, signature, etc.), or somewhere that the user is (e.g., being in a specific location). This information is what is known as identifier or digital credential. Sometimes a combination of information belonging to different of these categories is used, to improve security.

The effectiveness of any authentication solution cannot be measured only in terms of security—as many of them are equivalent on that aspect—but rather accounting also for usability, ease of implementation, and cost and energy consumption. Only by keeping into account all these aspects at the same time it is possible to obtain a wide adoption of the authentication solution by the users.

One of the main flaws of the current authentication solutions is represented by the fact that user credentials (password, token, or event fingerprint, etc.) are subject to copy, shoulder sniffing, or theft by malicious external observers, which can then access the objective service/asset by faking their identity to the one of an authorized user.

Tam Vu et al., "Capacitive Touch Communication: A Technique to Input Data through Devices' Touchscreen", describes a method to identify and authenticate users on touch screen devices, based on wearable artifacts actively generating an input, which will be detected by the capacitive screen and decoded as a binary sequence. The described solution uses an active device—ring, watch, etc.—as a low power continuous transmitter, to provide users with (continuous) authentication. On the contrary, present invention uses a passive device (card) to authenticate the end user.

Mohamed Azard Rilvan et al., "User authentication and identification on smartphones by incorporating capacitive touchscreen", leverages on a snapshot taken by a capacitive screen, of four fingers or an ear or a thumb and uses it as key for a one-time authentication to access specific services or resources in the device itself. The described solution is based on measurements of human body features, not 100% reliable by nature (and by claim of the authors). Furthermore, the described solution does not allow multi-sector division of the readable area to provide multi-service authentication and/or random request of a specific sector for the authentication, and/or coding of other data and metadata.

Sun, Jingchao, et al. "Touchin: Sightless two-factor authentication on multi-touch mobile devices" describes a solution to identify users on mobile devices on the basis of a gesture executed on the touch interface of the mobile device itself. The gesture detection is independent from the screen zone on which it is executed, preventing smudge attacks and making shoulder sniffing harder. The described solution relies on an authentication factor (i.e., the touch gesture) which cannot naturally translate into an encryption key, nor be divided into different sectors/areas to implement a multi-functional authentication nor an authentication based on random sector selection. Furthermore, the described solution presents a non-null set of visible elements, i.e., the signature, which is subject to shoulder sniffing by nature.

U.S. Pat. No. 9,652,066 describes a method for fingerprint reading all over a capacitive screen, also possible while performing other actions (touch, etc.). The fingerprint reading is then used as authentication factor for the user, eventually on a continuous basis. The solution requires specific hardware in the end device (i.e., a finger biometric sensing layer). Furthermore, the described solution is based on measurements of human body features. As such, the solution is not 100% reliable by nature and does not allow multi-sector division of the readable area to provide multi-service authentication and/or random request of a specific sector for the authentication.

EP-A1-2527955 is based on the detection of specific objects by mobile devices, by optical or capacitive sensing, in order to activate predetermined status of the device (e.g. standby). It may eventually be used also for authentication purposes, as stated in the patent. The object identification proposed in this patent application aims at associating a common object to a desired state (e.g., charger to standby) but not at differentiating multiple instances of the same object, nor at encoding a specific unique code into the object with authentication and/or encryption purposes.

WO-A1-2017143193 describes a method to identify and authenticate users on touch screen devices, based on wearable artifacts actively generating an input, which will be detected by the capacitive screen and decoded as a binary sequence. This solution refers to the one described also in the paper Tam Vu et al. "Capacitive Touch Communication: A Technique to Input Data through Devices' Touchscreen". The method uses an active device—ring, watch, etc.—as a low power continuous transmitter, to provide users with (continuous) authentication. On the contrary, present invention uses a passive device (card) to authenticate the end user.

US-A1-2016004407 relates to a system for user authentication based on a card with a multitouch surface touching. A multitouch capacitive surface that identifies the object and authenticates the user on the basis of a motion executed by the user using the card is also disclosed. The described system aims at the authentication of a set of users carrying different instances of the same authentication card. The described solution may include a motion that the user must execute with the card on the capacitive surface, introducing limiting constraints on the screen size. The described solution, in fact, is designed for the authentication in fix capacitive screens rather than in mobile devices with a limited capacitive surface, even if a variant solution is described also in the case of use of the capacitive surface of a mobile phone. Finally, no possibility is given to implement a multi-service authentication, nor a multi-sector authentication selecting a random sector/area in different authentication instances. Furthermore, no possibility to use the contact pattern as a part of an encryption code is included in this patent application.

KR-A-2016036133A discloses a system for user authentication and operation authorization based on a rubber-stamp that is applied on a capacitive screen of a mobile device and presents a specific capacitive pattern, allowing the user to authenticate for a service and/or to authorize specific operations. This solution does not decode the sequence of capacitive points into a code, as such, nor includes the device into the authentication and authorization process. In present invention, furthermore, the code decoded from the series of capacitive points is concatenated with a code in the device to form a unique key, which is used for authentication and authorization purposes, but may also be used to encrypt the communication with the service server. Finally, this solution does not include multiple capacitive zones to be used for randomization purposes or to authenticate and authorize different services and operations.

Known solutions still lack of high reliability, availability and ease of use. More solutions are therefore needed for user authentication and/or authorization.

DESCRIPTION OF THE INVENTION

Embodiments of the present invention provide according to a first aspect a system for user authentication and/or authorization, comprising a passive card to store a first portion of an authentication or authorization code via a set of capacitive points included in its surface; and a portable computing device having a capacitive screen and being configured to store a second portion of said authentication or authorization code.

In the proposed system, once the user has requested access to a specific service or to a specific operation, and when the passive card is in contact with the capacitive screen, the portable computing device is configured to read at least some of the set of capacitive points, decoding the first portion of the authentication or authorization code, and to cryptographically sign the decoded first portion using said store second portion of the authentication or authorization code, providing the authentication or authorization code, which is used as cryptographic key to grant access to said requested specific service or requested specific operation to the user. Thus, the proposed system represents a highly reliable authorization and/or authentication solution, while being usable, easy to implement, simple, cheap and with minimum energy consumption.

Preferably, the set of capacitive points are invisible to human inspection.

According to the proposed system, some of the capacitive points may include information about the user or metadata about the card distributor. The information or metadata is preferably encoded with an encoding system different to the encoding system used to encode the first portion of the authentication or authorization code. The set of capacitive points at least includes two capacitive points located in predefined parts of the passive card.

In an embodiment, the surface of the passive card is divided into different logical areas/sectors, each area/sector comprising a set of capacitive points encoding a different first portion of the authentication or authorization code such that each different first portion can be used to authenticate a different service or to authorize a different operation.

The portable computing device can include a mobile phone, a laptop, or a tablet, among others. In an embodiment, the second portion of the authentication or authorization code is stored in a subscriber identification module (SIM) of the portable computing device. Alternatively, in another embodiment, the second portion is stored in a memory of the portable computing device with restricted access.

Embodiments of the present invention also provide according to a second aspect a user authentication and/or authorization method. The method comprises storing a first portion of an authentication or authorization code through a set of capacitive points included on a surface of a passive card; storing a second portion of the authentication or authorization code in a portable computing device having a capacitive screen; once the user has requested access to a specific service or to a specific operation and when the passive card is in contact with the capacitive screen reading, by the portable computing device, at least some of the set of capacitive points, decoding the first portion of the authentication or authorization code; and cryptographically signing, by the portable computing device, the decoded first portion using the stored second portion of the authentication or authorization code, providing the authentication or authorization code, which is used as cryptographic key for granting access to said specific service or said specific operation to the user.

According to the proposed invention, the first portion of the authentication or authorization code depends on the shape, size and/or position of the set of capacitive points on the passive card.

In an embodiment, the reading is performed while the passive card is in contact with the capacitive screen in a specific position, for example a horizontal position or a vertical position of the passive card. Alternatively, the reading is performed while the passive card has undergone a specific movement, for example a rotation or a swipe of the passive card. The specific position or specific movement can be characteristic of a particular service or operation requested by the user.

In yet another embodiment, the storing of the second portion of the authentication or authorization code in the portable computing device is made after the passive card is given to the user. In this case, the second portion can be stored in the SIM of the portable computing device or in a memory thereof with restricted access. In case of lost or thievery of the passive card, the latter can be (temporary or permanently) blocked or can be replaced through a secure channel.

Other embodiments of the invention that are disclosed herein include software programs to perform the method embodiment steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

Present invention presents the following unique strengths:
- Does not require specific hardware to work but relies on hardware available on any current portable computing device (i.e., a capacitive input area).
- Does not require precision from the user in terms of executed gesture, as the passive card presents reference points for the reader, making the process more user friendly.
- Does guarantee a double factor of authentication, as the system is composed by two unique components, i.e., the passive card and the portable computing device, each one of which can only work in correspondence of the other corresponding one.
- Does not require an active device, but only a passive card of common "credit card" size, easy to carry and cheap to produce. Furthermore, the system is robust to partial damaging of the card, thanks to the multi-sector surface division.
- Is robust against attacks as the code is not visible on the card (shoulder sniffing, copying, distant photo) a physical contact is needed to read (and eventually copy the card)—unlike NFC—, the authentication key is partially stored in the passive card and partially stored in the computing device, making it ineffective to use the card on a different computing device (thievery), the key is encoded in a specific portion of the card, unknown to the attacker, and the authentication process may be based each time on a different code, unpredictable and randomly generated (Trojan viruses, hacker attacks, or phishing services). So, it is resilient to brute force attacks at least in 1/n of the times, being "n" the number of possible codes.
- Is easy and quick to use, as the user just needs to place the card on the capacitive surface of the computing device, without requiring card centering or a specific card positioning.
- May be used to authenticate for different services or to authorize different kind of operations, thanks to the multi-sector surface division.
- May not only be used as a token for identification and authentication, but a specific portion of the capacitive points may be used to encode information about the user (as an OpenID), or metadata about the system and the card distributor, among other possibilities. This information will be encoded using a different—open—encoding system, to make its decoding available to any use.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which.

DETAILED DESCRIPTION OF PREFERRED EMBODIMENTS

Figure 1:
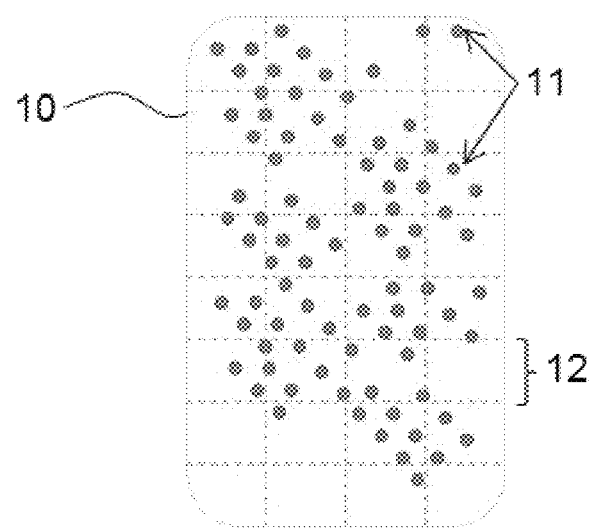
FIG. 1 illustrates an example of the capacitive points included in the passive card and a possible area/sector division.

Present invention proposes a user authentication and/or authorization system and method. The proposed solution leverages on the presence of a capacitive input area on portable computing devices 20 as a reader for a special passive card 10 including on its surface a set of capacitive points 11 (see FIG. 1). The capacitive points 11 result in pressure on the capacitive area, generating a specific and unique input.

The capacitive points 11 are easy and cheap to implement on a common plastic card (a passive device), while they are invisible to human inspection, making the solution robust against shoulder sniffing, distant photo or scanned, and the card surface keeps available for any printing (branding, advertisement, etc.). On the other hand, the card reading is executed by a capacitive surface which is currently present in any portable computing device 20 (e.g. Smartphone, tablet, laptop, etc. having a touch screen or touch pad), not requiring any additional or specific hardware, unlike other solutions based on NFC technology or fingerprint reading.

The card may include a pair (or more) of specific capacitive points located in pre-established points of the card, for example positioned at two opposite corners, at three different corners as in the QR codes in case of including three capacitive points, etc., in order to make it easy to remove any measurement offset from the input reading and make it easier the card reading (i.e., not having to center it with respect to any mark, nor placing it in a specific position). In case the card only includes two capacitive points these will have a non-symmetrical form and unique in the pattern.

Preferably, the number, size, shape or position of the capacitive points 11, or a combination of at least two of these characteristics (depending of the quality or quantity of the information to encode) is used to encode a unique sequence (or first portion of an authentication or authorization code). The number of possible sequences is high enough to guarantee uniqueness between different created cards. The unique sequence is then cryptographically signed using as a key another unique sequence (or second portion of the authentication or authorization code) stored in the portable computing device 20 and preferably obtained at the time of the installation of an specific software application that will be used to perform the passive card 10 reading, representing a unique pairing with the unique sequence (or first portion) encoded in the passive card 10. The sequence obtained from the concatenation represents the authentication or authorization code that can be used as a cryptographic key to access to the required service and/or authorize the required operation. The portion of the code stored in the portable computing device 20 may be located in the SIM card or in other memory portions with restricted access, as the security elements (SE) with what some smartphones have.

The presence of two different code portions (first portion and second portion or card code portion and device code portion as can be also termed), located into two different physical devices (i.e., the portable computing device 20 and the passive card 10) make the system robust against thievery, as the theft of one of the two elements alone does not allow any access/authorization, while the absence of the devices will easily be noticed, and the access devices may be remotely blocked by the user himself through a proper software procedure.

As can be seen in the embodiment of FIG. 1, the surface of the passive card 10 may be divided into different logical areas or sectors 12, each one comprising a set of capacitive points encoding a unique sequence (or different first portion of an authentication or authorization code).

The presence of different areas 12 in the passive card 10, corresponding to different encoded sequences, allow the following extra functionalities for the system:

Using different areas 12 to access to different services (e.g., bank #1, bank #2, other service, etc.) or to authorize different kind of operations.

Guaranteeing redundancy in case of partial damaging of the passive card 10.

Allowing to require the code corresponding to a random (sequence of) sector for different instances of the authentication to the same service or of the authorization of an operation. This is functionally equivalent to the current code cards released to bank customers for e-banking access. These results in unpredictable access coordinates, randomly designated, and hence prevents code thievery through false websites, Trojan viruses or hacker attacks, making the transaction secure. It allows not only to authenticate but to authorize, just in the same card.

The position of the passive card 10 with respect to the reading surface (e.g., horizontal/vertical, etc.) or a specific movement to be executed with the passive card 10 on the reading surface (e.g., rotation, swipe, etc.) may or may not be used as a further authentication element for the system, based on something that the user knows. For example, the system can be configured in such a way that an horizontal position of the passive card 10 on the reading surface is for accessing a given service whereas a swipe of the passive card 10 on the reading surface is for accessing another different given service.

Figure 2:
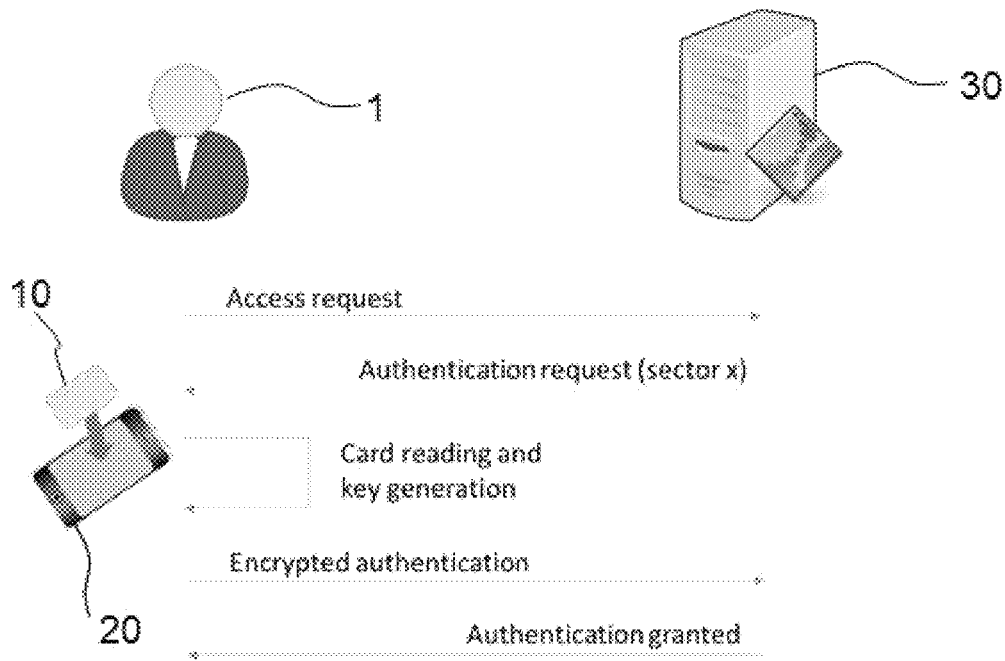
FIG. 2 is a flow diagram of an example authentication process.

With reference now to FIG. 2, therein it is illustrated an embodiment of a user authentication and/or authorization method using the proposed system. First, the passive card 10 is produced, encoding a specific code (the first portion of the authentication or authorization code) through the sequence of capacitive points 11 printed on its surface. The passive card 10 is then given to the user 1 and a specific secret code (the second portion of the authentication or authorization code), associated with the passive card 10 as a unique pair, is stored in a trusted memory area in its portable computing device 20 (in this particular case a smartphone), preferably when the software application is installed to perform the passive card 10 reading.

The user 1 remotely connects to a server 30 requiring access to a specific service (e.g., e-banking, access to restricted information, etc.) or to authorize a specific operation (e.g., money transfer, publication of content, etc.). This access may be executed either on the portable computing device 20 or on any other computing device, including fix devices such as a PC.

The server 30 requires a specific user authentication to proceed with the required operation. The server 30 may include in this request the identification of a specific card area 12, or sequence of card areas, depending on the implementation.

If the user 1 is accessing the service from a computing device different to the portable computing device 20, the computing device employed connects to the portable computing device 20 using a secure connection and requires it to proceed with the authorization procedure. Otherwise, the portable computing device 20 directly proceeds with the authentication procedure. The user 1 locates the passive card 10 over the capacitive surface of the portable computing device 20, eventually in a specific position or with a specific movement; depending on the implementation. The card input (sequence of capacitive points on its surface) is read by the portable computing device 20. The whole surface or a specific (sequence of) area(s) is decoded by the software application installed in the portable computing device 20. The resulting code is then cryptographically signed using as a key the unique code (second portion of the authentication or authorization code) stored in the portable computing device 20 to obtain a cryptographic key to be used by the portable computing device 20 to confirm the authentication to the server 30.

Finally, on the basis of the received communication, the server 30 authenticates the user 1/authorizes the operation, or not.

In the case of lost/thievery of one of the two components 10, 20 of the described system, the user 1 may require to the distributor, behind a specifically required authentication:

The (temporal) block of the operations executed with its user (e.g., loss of both elements).

The cancellation of the previously owned passive card 10 and the re-pairing of his/her portable computing device 20 with a new passive card 10, which will be provided through a secure channel (e.g., loss of the passive card 10).

The cancellation of the previously owned code for the portable computing device 20 and the re-pairing of his/her passive card 10 with a new portable computing device 20 (e.g., loss of the portable computing device 20).

In an embodiment, as a further feature, a specific portion of the capacitive points 11 may be used to encode some other kind of information, including metadata about the distributor or the system itself, or some open information about the user 1, serving as an OpenID or as a further level of validation. This information would be encoded using a different encoding system, as this may be available for open decoding.

The methods and systems discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system for user authentication and/or authorization, comprising:
   a passive card configured to store a first portion of an authentication or authorization code via a set of capacitive points included on a surface of the passive card, wherein the surface of the passive card is divided into different logical areas, each one comprising a set of capacitive points encoding a different first portion, each different first portion configured to authenticate a different service or to authorize a different operation; and
   a portable computing device of a user, the portable computing device having a capacitive screen and being configured to store a second portion of said authentication or authorization code, such that once the user has requested access to a specific service or to a specific operation, and when the passive card is in contact with the capacitive screen, the portable computing device is further configured to read at least some of the set of capacitive points, decoding the first portion of the authentication or authorization code, and to cryptographically sign the decoded first portion using said stored second portion of the authentication and authorization code, providing the authentication or authorization code, which is used as cryptographic key to grant access to said specific service or specific operation to the user.

2. The system of claim 1, wherein the set of capacitive points is invisible to human inspection.

3. The system of claim 1, wherein some of the capacitive points of the set of capacitive points include information about the user or metadata about a card distributor, the information or metadata being encoded with an encoding system different to the encoding system used to store the first portion of the authentication or authorization code.

4. The system of claim 1, wherein the set of capacitive points includes at least two capacitive points located in predefined parts of the passive card.

5. The system of claim 1, wherein the first portion of the authentication or authorization code depends on the shape, size and/or position of the set of capacitive points on the passive card.

6. The system of claim 1, wherein the portable computing device is a mobile phone, a laptop or a tablet and wherein the second portion of the authentication or authorization code is stored in a subscriber identification module, SIM, of the portable computing device or in a memory thereof with restricted access.

7. A user authentication and/or authorization method, comprising:
   storing a first portion of an authentication or authorization code through a set of capacitive points included on a surface of a passive card, wherein the surface of the passive card is divided into different logical areas, each one comprising a set of capacitive points encoding a different first portion, each different first portion configured to authenticate a different service or to authorize a different kind of operation;
   storing a second portion of said authentication or authorization code in a portable computing device of a user, the portable computing device having a capacitive screen;
   once the user has requested access to a specific service or to a specific operation and when the passive card is in contact with said capacitive screen reading, by the portable computing device, at least some of the set of capacitive points, decoding the first portion of the authentication or authorization code; and
   cryptographically signing, by the portable computing device, the decoded first portion using the stored second portion of the authentication or authorization code, providing the authentication or authorization code, which is used as cryptographic key for granting access to said specific service or specific operation to the user.

8. The method of claim 7, wherein some of the capacitive points of the set of capacitive points include information about the user or metadata about a card distributor, the information or metadata being encoded with an encoding system different to the encoding system used to store the first portion of the authentication or authorization code.

9. The method of claim 7, wherein the set of capacitive points includes at least two capacitive points located in predefined parts of the passive card, and wherein the set of capacitive points is invisible to human inspection.

10. The method of claim 7, wherein the first portion of the authentication or authorization code depends on the shape, size and/or position of the set of capacitive points on the passive card.

11. The method of claim 7, wherein said reading is performed while the passive card is in contact with said capacitive screen in a specific position, including an horizontal position or a vertical position of the passive card, or while the passive card has undergone a specific movement, including a rotation or a swipe of the passive card, and wherein the specific position or specific movement being characteristic of the service or operation requested by the user.

12. The method of claim 7, wherein the storing of the second portion of the authentication or authorization code in the portable computing device is made after the passive card is given to the user, wherein the second portion is stored in a subscriber identification module, SIM, of the portable computing device or in a memory thereof with restricted access, and wherein in case of lost or thievery of at least the passive card, the latter is blocked during a given period of time or is replaced through a secure channel.

13. A computer program product comprising program code instructions that when executed by a processor of a portable computing device implement a user authentication and/or authorization method by:
   dividing the surface of a passive card into different logical areas, each area comprising a set of capacitive points encoding a different first portion of an authentication or authorization code, each different first portion configured to authenticate a different service or to authorize a different kind of operation reading at least some of the set of capacitive points, said reading being performed when the passive card is in contact with a capacitive screen of the portable computing device and once a user has requested access to a specific service or to specific operation;

as a result of said reading decoding the first portion; and cryptographically signing the decoded first portion using a second portion of said authentication or authorization key stored in the portable computing device, providing the authentication or authorization code, which is used as cryptographic key for granting access to said specific service or specific operation to the user.

* * * * *